United States Patent
Toyozawa et al.

(10) Patent No.: US 7,170,283 B2
(45) Date of Patent: Jan. 30, 2007

(54) DEVICE FOR DETECTING A POSITION OF A MAGNETIC POLE

(75) Inventors: Yukio Toyozawa, Kikuchi-gun (JP); Naoto Sonoda, Kamimashiki-gun (JP)

(73) Assignee: Fanuc Ltd., Yamanashi (JP)

( * ) Notice: Subject to any disclaimer, the term of this patent is extended or adjusted under 35 U.S.C. 154(b) by 119 days.

(21) Appl. No.: 10/986,201

(22) Filed: Nov. 12, 2004

(65) Prior Publication Data

US 2005/0104582 A1    May 19, 2005

(30) Foreign Application Priority Data

Nov. 18, 2003    (JP)    ............................. 2003-388384

(51) Int. Cl.
G01B 7/30    (2006.01)
(52) U.S. Cl. ........................... 324/207.25; 324/207.14; 318/807; 318/700
(58) Field of Classification Search ........... 324/207.14, 324/207.25, 160, 165, 166, 173, 174, 177; 318/700–724, 801, 807
See application file for complete search history.

(56) References Cited

U.S. PATENT DOCUMENTS

| 6,445,154 B1 * | 9/2002 | Toyozawa et al. | ........... 318/700 |
| 6,801,011 B2 * | 10/2004 | Ide | ............................ 318/700 |
| 2005/0110452 A1 | 5/2005 | Toyozawa et al. | |

FOREIGN PATENT DOCUMENTS

| EP | 1 432 112 A1 | 6/2004 |
| JP | 2000-312493 | * 11/2000 |
| JP | 2002-78391 | 3/2002 |
| JP | 2002-165483 | 6/2002 |

(Continued)

OTHER PUBLICATIONS

Chen Rong et al., "Rotor Position Detection and Insipient Position Location of PMSM", Oct. 2003.

(Continued)

*Primary Examiner*—Jay M. Patidar
(74) *Attorney, Agent, or Firm*—Drinker Biddle & Reath LLP

(57) ABSTRACT

A position-of-magnetic-pole detecting device includes first and second units for inferring a position of a magnetic pole. The first unit applies a current command while changing an excitation phase, infers a domain, where the position of a magnetic pole lies and which has the width thereof determined with a range of electrical angles, from the direction of rotation in which a motor rotates, and the excitation phase, and reduces the domain so as to infer the position of a magnetic pole. The second unit infers the position of a magnetic pole from a fed-back current returned responsively to a voltage command applied with the excitation phase sequentially changed. Thereafter, a voltage high enough to cause magnetic saturation is applied in order to determine the orientation of a magnetic pole, whereby the position of a magnetic pole is inferred. Although the first unit is selected, if the motor does not move due to friction or the like, the second unit is used to infer the position of a magnetic pole. If the position of a magnetic pole inferred by the second unit differs from one value to another, the first unit is used to infer the position of a magnetic pole.

6 Claims, 7 Drawing Sheets

FOREIGN PATENT DOCUMENTS

| | | |
|---|---|---|
| JP | 20022171798 A | 6/2002 |
| JP | 2003-52193 | 2/2003 |
| JP | 3408468 | 3/2003 |
| JP | 2005-130582 | 5/2005 |

OTHER PUBLICATIONS

Consoli et al., "Industry Application of Zero-Speed Sensorless Control Techniques for PM Synchronous Motors"; *IEEE Transactions on Industry Applications,* vol. 37, No. 2, Mar./Apr. 2001, pp. 513-521.

* cited by examiner

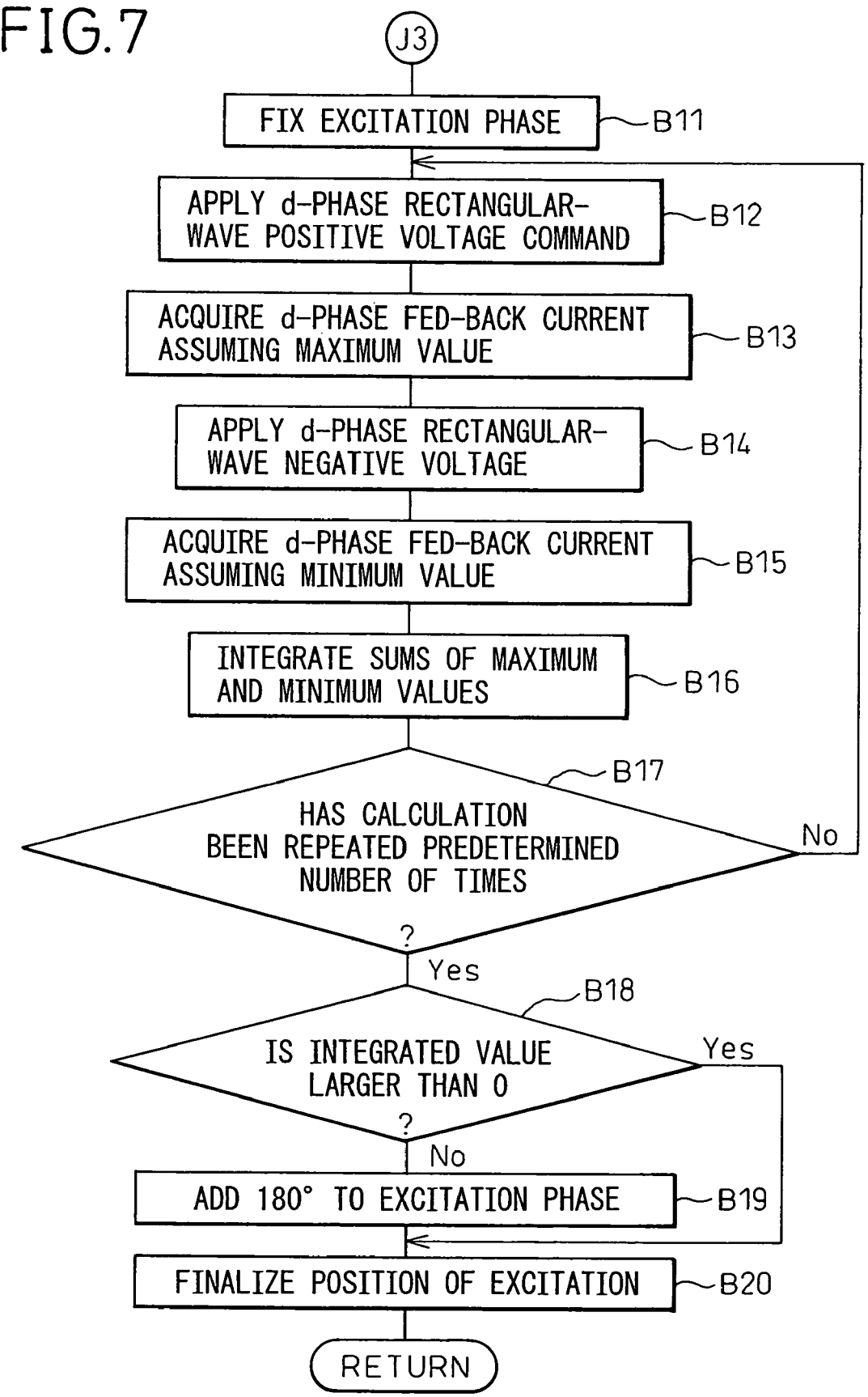

US 7,170,283 B2

DEVICE FOR DETECTING A POSITION OF A MAGNETIC POLE

BACKGROUND OF THE INVENTION

1. Field of the Invention

The present invention relates to detection of a position of a magnetic pole in a rotor included in a synchronous motor.

2. Description of the Related Art

In synchronous motors, a current is caused to flow through each of phase windings according to a position of a magnetic pole in a rotor for the purpose of generating a desired torque. An encoder or another sensor is used to detect the position of a magnetic pole in the rotor so that a current will flow in the direction of an appropriate excitation phase. This necessitates the employment of a sensor that is sensitive to an absolute value permitting detection of the position of a magnetic pole or the work of aligning a sensor with the position of a magnetic pole. In efforts to obviate the necessity of the employment of the sensor and the work of alignment, detection of the position of a magnetic pole is performed at the time of starting a motor.

Various methods have been proposed as methods of detecting a position of a magnetic pole without a sensor. According to methods including, for example, a method disclosed in Japanese Unexamined Patent Application Publication No. 2000-312493 (first patent document), certain voltages of positive and negative polarities that are regarded as vectors are applied to a permanent-magnet motor with the angle between the vectors varied at regular intervals. Currents flowing through the motor in responsive to the positive and negative voltages are detected. The positions of the terminal points of the vectors at which the currents have the largest difference are detected as the positions of magnetic poles.

According to methods including, for example, a method disclosed in Japanese Unexamined Patent Application Publication No. 2002-78391 (second patent document), a microscopic voltage transient is produced in a salient-pole type motor, and a position of a magnetic pole is inferred from the microscopic voltage transient and a change rate of a component of a current flowing through the motor.

According to methods including, for example, a method disclosed in Japanese Unexamined Patent Application Publication No. 2002-165483 (third patent document), a high-frequency voltage is applied to a salient-pole type motor. A high-frequency current whose frequency is identical to the frequency of the high-frequency voltage is sampled from a current flowing through an armature. The position of a rotor is inferred from the high-frequency current. A positive or negative offset is added to the inferred position of a rotor according to the polarity of the high-frequency current detected immediately after the motor is started, whereby an initial value of the inferred position of a rotor is calculated.

According to methods including, for example, a method disclosed in Japanese Unexamined Patent Application Publication No. 2003-52193 (fourth patent document), a high-frequency voltage is applied to a salient-pole type motor, and a position of a magnetic pole is detected based on a detected high-frequency current.

According to methods including, for example, a method disclosed in Japanese Patent No. 3408368 (fifth patent document), a short-period current is caused to flow in the direction of a predetermined excitation phase in a stator. Based on the direction of a motion made by a rotor at that time, the excitation phase is changed and the short-period current is caused to flow. This process is repeated in order to detect the position of a magnetic pole.

In terms of a structure, a rotor included in a permanent-magnet synchronous motor falls broadly into a surface permanent magnet (SPM) type having a permanent magnet bonded to the surface of a rotor and an interior permanent magnet (IPM) type having a permanent magnet embedded in a rotor. In general, the SPM motor is of a non-salient pole type in which a d-axis inductance and a q-axis inductance offered by windings on an armature are equal to each other, while the IPM motor is of a salient-pole type in which the d-axis and q-axis inductances are different from each other. The methods described in the first to fourth patent documents for detecting a position of a magnetic pole by applying a voltage to a motor and detecting a current that flows through an armature can be adapted to the salient-pole type motor but cannot be adapted to the non-salient pole type SPM motor.

On the other hand, a method described in the fifth patent document can be adapted to any synchronous motor irrespective of whether the synchronous motor is of the salient-pole type or non-salient pole type. However, the method requires some motion of a rotor. If the rotor makes no motion because of large friction of a machine, a position of a magnetic pole cannot be detected correctly.

The present applicant has proposed a method of detecting a position of a magnetic pole without the motion of a rotor in Patent Application No. 2003-362379. However, the method utilizes the electric characteristic of the salient-pole type and magnetic saturation and cannot therefore be adapted to the non-salient pole type SPM motor.

SUMMARY OF THE INVENTION

Accordingly, an object of the present invention is to provide a position-of-magnetic-pole detecting device capable of accurately detecting a position of a magnetic pole without the necessity of learning in advance a mechanical characteristic concerning friction or the properties of a motor (whether the motor is of a salient-pole type or non-salient-pole type, with or without magnetic saturation, or other properties.)

According to the first aspect of the present invention, a position-of-magnetic-pole detecting device for detecting a position of a magnetic pole in a rotor included in a synchronous motor comprises: a current command applying means for applying a current command in the direction of a predetermined excitation phase; a first position-of-magnetic-pole inferring means for inferring a position of a magnetic pole from the direction of rotation in which the motor rotates responsively to the current command; a voltage command applying means for applying a voltage command in the direction of the predetermined excitation phase; a second position-of-magnetic-pole inferring means for inferring the position of a magnetic pole from a fed-back current returned responsively to the voltage command; and a means for selecting either of the first and second position-of-magnetic-pole inferring means that infer the position of a magnetic pole. The first aspect is intended to prevent an event that a position of a magnetic pole cannot be detected because of a mechanical characteristic concerning friction or the like, and to make it possible to detect the position of a magnetic pole in a non-salient pole type synchronous motor. According to the second aspect of the present invention, a position-of-magnetic-pole detecting device comprises: a current command applying means for applying a current command in the direction of a predetermined excitation phase; a first position-of-magnetic-pole inferring means for inferring a domain, where the position of a magnetic pole lies and which has the width thereof determined with a range of electrical angles, from the direction of rotation in which the motor is rotated responsively to the current command, and an excitation phase, and narrowing the domain so as to infer the position of a magnetic position; a voltage command applying means for applying a voltage command in the direction of the predetermined excitation phase; a second position-of-magnetic-pole inferring means for inferring the orientation of a magnetic pole from a fed-back current returned responsively to the voltage command applied with an excitation phase changed sequentially, applying a voltage that causes magnetic saturation so as to determine the orientation of a magnetic pole, and inferring the position of a magnetic pole; and a means for selecting either of the first and second position-of-magnetic-pole inferring means that infer the position of a magnetic pole. The second aspect is intended to prevent an event that the position of a magnetic pole cannot be detected because of a mechanical characteristic concerning friction or the like, and to make it possible to detect the position of a magnetic pole in a non-salient-pole type synchronous motor.

Although a current command is applied so that the first position-of-magnetic-pole inferring means will infer a position of a magnetic pole, if the motor is not rotated, the means for selecting either of the first and second position-of-magnetic-pole inferring means may autonomously select the second position-of-magnetic position inferring means. Moreover, if a difference between positions of a magnetic pole inferred by the second position-of-magnetic-pole inferring means exceeds a predetermined range, the means for selecting either of the first and second position-of-magnetic-pole inferring means may autonomously select the first position-of-magnetic-pole inferring means.

Incidentally, the terms employed in the Claims are not limited to specific meanings described in relation to embodiments.

BRIEF DESCRIPTION OF THE DRAWINGS

The present invention will be more clearly understood from the description set below with reference to the accompanying drawings, wherein:

FIG. 6 and FIG. 7 describe an algorithm defining second position-of-magnetic-pole inference included in the embodiment.

DETAILED DESCRIPTION

Figure 1:
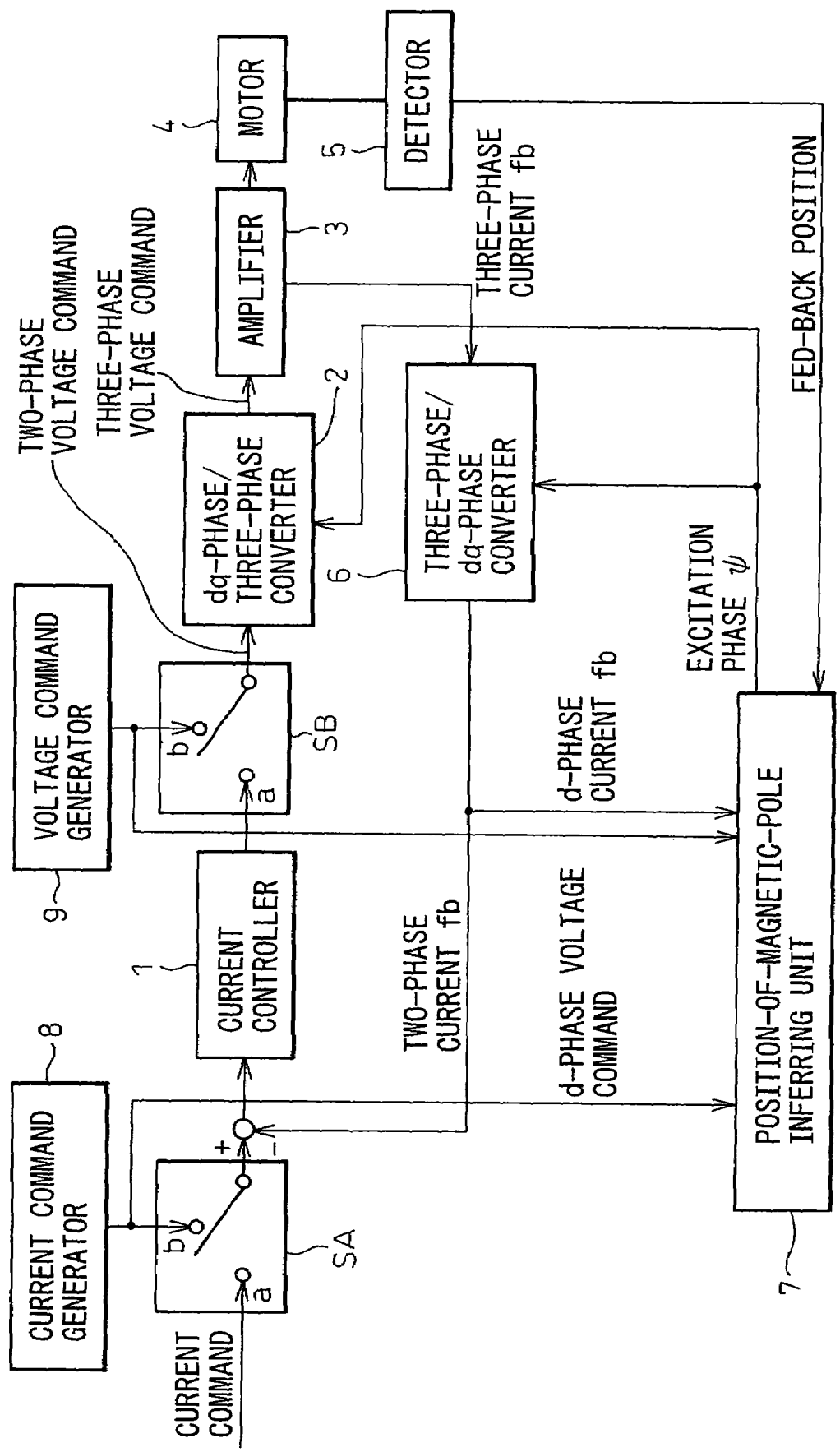
FIG. 1 is a block diagram of an embodiment of motor control equipment based on which a position-of-magnetic-pole detecting device in accordance with the present invention is realized.

FIG. 1 is a block diagram of an embodiment of motor control equipment based on which a position-of-magnetic-pole detecting device in accordance with the present invention is realized. For normal driving and control of a motor, switches SA and SB have the contacts a thereof made. A converter 6 for converting a three-phase current into a dq-phase current converts a three-phase fed-back current into a dq-phase fed-back current. The d-phase and q-phase current components of the dq-phase fed-back current are subtracted from d-phase and q-phase current commands respectively, whereby deviations of the d-phase and q-phase current components are calculated. A current controller 1 performs feedback control on a current and issues a voltage command. Based on the position of a rotor included in the motor which is detected by a detector 5, a position-of-magnetic-pole inferring unit 7 calculates an excitation phase ψ. Based on the excitation phase, a converter 2 for converting a dq-phase voltage into a three-phase voltage converts the voltage command into a three-phase voltage command. Consequently, a motor 4 is driven or controlled via an amplifier 3. The procedure for driving or controlling the motor 4 does not change from a conventional motor driving/control method.

According to the present invention, the switches SA and SB, a current command generator 8, and a voltage command generator 9 are added to the foregoing motor driving elements 1, 2, 3, 5, and 6, and the configuration of the position-of-magnetic-pole inferring unit 7 is modified. Thus, a position-of-magnetic-pole detecting device is realized.

The present embodiment includes, as a position-of-magnetic-pole detecting means, a means for detecting a position of a magnetic pole by actuating a rotor included in a motor (hereinafter, the means shall be referred to as a first position-of-magnetic-pole inferring means, and the method shall be referred to as a first position-of-magnetic-pole inferring method), and a means for detecting a position of a magnetic pole in a motor, which has the electrical characteristic of a salient-pole type, on the basis of a fed-back current, which is returned responsively to application of a voltage to the motor, without actuating the rotor (hereinafter, the means shall be referred to as a second position-of-magnetic-pole inferring means, and the method shall be referred to as a second position-of-magnetic-pole inferring method).

The first position-of-magnetic-pole inferring means included in the present embodiment is based on a means described in the fifth patent document. When a method implemented in the means is adopted, the switch SA has a contact b thereof made and the switch SB has the contact a thereof made. The motor is thus disconnected from a normal control system. The current command generator 8 transmits a current having a d-phase current component of a zero level and a q-phase current component of a predetermined dc exciting current, whereby the motor is driven.

According to the method, if a current has a vector I and a magnetic flux has a vector Φ, the torque T exerted in a synchronous motor is expressed as follows:

$$T = a(I \times \Phi)$$

where a denotes a constant and × denotes calculation of an outer product. The torque value is expressed as follows:

$$|I||\Phi| \sin \alpha$$

The direction of rotation produced by the torque is determined with an angle α formed between the current vector I and magnetic flux vector Φ. When the angle α falls within a range from 0° to 180°, sin α is larger than 0. The rotor is therefore rotated in a positive direction. When the angle α falls within a range from 180° to 360°, sin α is smaller than 0. The rotor is therefore rotated in a negative direction. Consequently, according to the present embodiment, a direct current is caused to flow in the direction of an excitation phase of 180° in a stator for the purpose of detecting a direction of rotation in which the rotor rotates. If the rotor rotates in the positive direction, a position of a magnetic pole in the rotor (position of the terminal point of the magnetic flux vector Φ) is thought to lie within a domain whose width is determined with a range of excitation phases in the stator from 180° to 360°. If the rotor rotates in the negative direction, the position of a magnetic pole in the rotor is thought to lie within a domain whose width is determined with a range of excitation phases from 0° to 180°. Thereafter, a direct current is caused to flow in the direction of an intermediate excitation phase within the range of excitation phases (range from 180° to 360° or range from 0° to 180°) determining the width of the domain in the rotor where the position of a magnetic pole lies. The direction of rotation of the rotor is then detected, and the domain in the rotor where the position of a magnetic pole lies is detected. This procedure is repeated in order to sequentially reduce the domain in the rotor where the position of a magnetic pole lies. Finally, the position of a magnetic pole in the rotor is detected.

For example, if the position of a magnetic pole in the rotor lies in the direction of an excitation phase of 350° in the stator, a current is first caused to flow in the direction of an excitation phase of 180°. The angle α is calculated as 350−180=170°, and sin 170 is larger than 0. The rotor is therefore rotated in the positive direction. The position of a magnetic pole in the rotor is thought to lie within a domain whose width is determined with the range of excitation phases from 180° to 360°. Thereafter, a direct current is caused to flow in the direction of an excitation phase of 270° which halves the domain. The angle α is calculated as 350−270=80°, and sin 80 is larger than 0. The rotor therefore rotates in the positive direction. Consequently, the position of a magnetic pole in the rotor is thought to lie within a domain whose width is determined with a range of excitation angles from 270° to 360°. Thereafter, a direct current is caused to flow in the direction of an excitation phase of 315° that is the intermediate value within the range from 270° to 360°. Even in this case, the angle α is calculated to be 35, and the direction of rotation is the positive direction. A direct current is then caused to flow in the direction of an excitation phase of 337.5° that is the intermediate value within the range from 315° to 360°. Even in this case, the angle α is calculated to be 12.5, and the rotor rotates in the positive direction. A current is then caused to flow in the direction of an excitation phase of 348.75° that is the intermediate value within the range from 337.5° to 360°. Even in this case, the rotor rotates in the positive direction. A current is then caused to flow in the direction of an excitation phase of 354.375° that is the intermediate value within the range from 348.75° to 360°. At this time, the angle α is calculated as 350−354.374=−4.375°, and sin α is smaller than 0. The rotor therefore rotates in the negative direction. A phase at which excitation is induced next is 351.5627° that is the intermediate value within the range of excitation phases from 348.75° to 354.375°. A direct current is then caused to flow in the direction of the excitation phase of 351.5627°, and the direction of rotation is detected. Thus, a domain in the rotor where the position of a magnetic pole is thought to lie is reduced sequentially. The checking of a domain where the position of a magnetic pole is thought to lie is repeated until the rotor does not rotate any longer or for a predetermined number of times, whereby the position of a magnetic pole in the rotor is determined.

Moreover, the second position-of-magnetic-pole inferring means included in the present embodiment is based on the method and means proposed in the Japanese Patent Application No. 2003-362379. The switch SB has the contact b thereof made, and the voltage command generator transmits a voltage command whose d-phase component is a high-frequency voltage or a rectangular-wave voltage. Thus, a position of a magnetic pole is detected without any motion of the rotor. The principles of the method will be described below.

Figure 2:
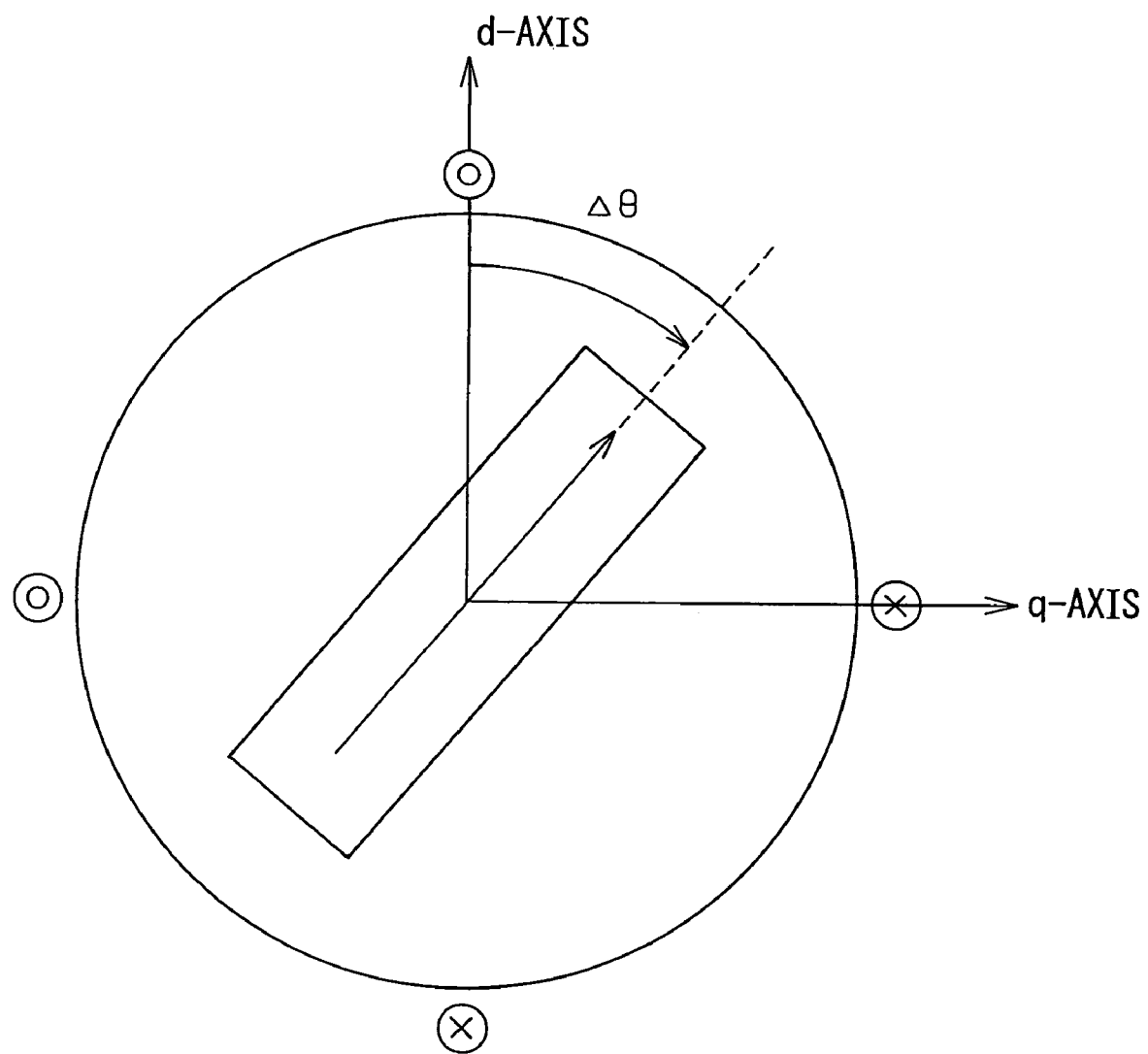
FIG. 2 is an explanatory diagram concerning a deviation of a position of a magnetic pole from a d-axis in a dq coordinate system.

If a magnetic flux $(\lambda_d, \lambda_q)$ is defined in a dq coordinate system associated with a salient-pole type motor including two phase windings, the deviation of a rotor (magnetic pole) from a d-axis is, as shown in FIG. 2, a deviation $\Delta\theta$, the magnetic flux $(\lambda_d, \lambda_q)$ is expressed as a function of the deviation $\Delta\theta$ according to the following formulae (1-1) and (1-2):

$$\lambda_d = (L_0 + L_2 \cos 2\Delta\theta) \cdot i_d - L_2 \sin 2\Delta\theta i_q + \phi \cos \Delta\theta \quad (1\text{-}1)$$

$$\lambda_q = -L_2 \sin 2\Delta\theta \cdot i_d + (L_0 - L_2 \cos 2\Delta\theta) \cdot i_q - \Phi \sin \Delta\theta \quad (1\text{-}2)$$

where $L_0$ denotes an average inductance independent of an excitation phase, and $L_2$ denotes a variation inductance dependent on the excitation phase. If the d-axis inductance offered by one phase winding is $L_d$ and the q-axis inductance offered by one phase winding is $L_q$, $L_d$ is provided as $L_d = L_0 + L_2$ and $L_q$ is provided as $L_q = L_0 - L_2$, in the case of the salient-pole type motor, the relationship of $L_2 < 0$ and $L_q > L_d$ are established. In the formulae (1-1) and (1-2), $\Phi$ denotes a magnetic flux induced by a magnet.

Using the d-coordinate and q-coordinate, a voltage $V_{dq}$ (a synthetic voltage having a d-axis voltage component and a q-axis voltage component) is provided by the following formula (2):

$$V_{dq} = Rs \cdot i_{dq} + d/dt(\lambda_{dq}) + \omega \pi \lambda_{dq} \quad (2)$$

where Rs denotes a resistance offered by the phase windings on an armature, $\lambda_{dq}$ denotes a synthetic magnetic flux of a d-axis magnetic flux and a q-axis magnetic flux, $i_{dq}$ denotes a synthetic current of a d-axis current and a q-axis current, and ω denotes an angular speed of the armature.

When the formulae (1-1) and (1-2) are assigned to the formula (2), the following formula (3) is provided:

$$\begin{bmatrix} v_d \\ v_q \end{bmatrix} = \begin{bmatrix} Rs + pL_{dc} + \varpi L_{dqc} & -pL_{dqc} + \varpi L_{dc} \\ -pL_{dqc} - \varpi L_{qc} & Rs + pL_{qc} - \varpi L_{dqc} \end{bmatrix} \begin{bmatrix} i_d \\ i_q \end{bmatrix} + \omega\phi \begin{bmatrix} \sin \Delta\theta \\ \cos \Delta\theta \end{bmatrix} \quad (3)$$

where $L_{dc}$ is provided as $L_{dc} = L_0 + L_2 \cos 2\Delta\theta$, and $L_{qc}$ is provided as $L_{qc} = L_0 - L_2 \cos 2\Delta\theta$, $L_{dqc}$ is provided as $L_{dqc} = L_2 \sin 2\Delta\theta$, and p is provided as p=d/dt.

When the current $i_{dq}$ is calculated using the formula (3), the following formula (4) is provided:

$$p \begin{bmatrix} i_d \\ i_q \end{bmatrix} = \frac{1}{L_d \cdot L_q} \begin{bmatrix} L_{qc} & L_{dqc} \\ L_{dqc} & L_{dc} \end{bmatrix} \left\{ \begin{bmatrix} v_d \\ v_q \end{bmatrix} - \begin{bmatrix} Rs + \varpi L_{dqc} & -\varpi L_{qc} \\ \varpi L_{dc} & Rs - \varpi L_{dqc} \end{bmatrix} \begin{bmatrix} i_d \\ i_q \end{bmatrix} - \right. \quad (4)$$

$$\varpi\phi\begin{bmatrix}\sin\Delta\theta\\\cos\Delta\theta\end{bmatrix}\Big\}$$

In order to detect a difference between the inductances offered by a salient-pole type motor, a d-axis voltage command containing a harmonic, Vd=V sin γt, and a q-axis voltage command Vq=0 are applied. In this case, the second term in the right side of the formula (4) is supposedly unaffected by the harmonic, and the rotor is assumedly at a standstill. Therefore, the angular speed of the armature ω is 0. The formula (4) is rewritten as follows:

$$p\begin{bmatrix}i_d\\i_q\end{bmatrix}=\frac{1}{L_d\cdot L_q}\begin{bmatrix}L_{qc}&L_{dqc}\\L_{dqc}&L_{dc}\end{bmatrix}\begin{bmatrix}V\sin\gamma t\\0\end{bmatrix}\quad(5)$$

When the deviation Δθ is varied by rotating the dq coordinate system, that is, when an excitation phase is changed from one phase to another, the inductances characteristic of a salient-pole type vary. Consequently, the amplitude of a fed-back current $i_f$ returned in response to a high-frequency voltage command varies. A change (derivative) $Pi_d$ in a d-axis current component of the fed-back current $i_f$ is calculated, and multiplied by the high-frequency command voltage $v_d$=V sin γt. Thereafter, a high-frequency component is removed from the resultant voltage using a low-pass filter, whereby a voltage assuming two peak values within one cycle of 360° thereof is obtained. If $v_d$=V sin γt is rewritten as $v_{dh}$=V sin γt, the following formula is provided:

$$pi_d \cdot v_{dh} = (1/(L_d \cdot L_q))(L_0 - L_2\cos 2\Delta\theta)\cdot V^2 \cdot (\sin\gamma t)^2 \quad(6)$$
$$= (V^2/2\cdot L_d\cdot L_q))\cdot(L_0 - L_2\cos 2\Delta\theta)\cdot(1-\cos 2\gamma t)$$

When the high-frequency component cos 2γt is removed using a low-pass filter, the resultant voltage is expressed as follows:

$$f_d = pi_d \cdot v_{dh} = (V^2/4\cdot L_d\cdot L_q)\cdot(L_d+L_q-(L_d-L_q)\cos 2\Delta\theta) \quad(7)$$

Based on the formula (7), when the deviation Δθ is 0 or π, $f_d$ equals $V^2/(2L_d)$. When the deviation Δθ is π/2 or 3π/2, $f_d$ equals $V^2/(2L_q)$.

As the IPM motor is of an inverse salient-pole type, the relationship of $L_q>L_d$ is established. Therefore, when the deviation Δθ is 0 or π, the voltage $f_d=pi_d\cdot v_{dh}$ assumes a peak value. Namely, after the derivative $pi_d$ of a d-phase fed-back current is multiplied by a high-frequency command voltage, a high-frequency component is removed from the resultant voltage. Consequently, two peak values are detected within one cycle of 360° of the voltage. The peak values are associated with the values 0 and π of the deviation Δθ signifying that the position of the rotor (magnetic pole) is consistent with the d-axis of the dq coordinate system. Therefore, the direction of a magnetic flux is identified by detecting excitation phases that cause the voltage $f_d$ to assume the peak values. Even when the direction of the magnetic flux is identified, the north and south poles of the magnet cannot be distinguished from each other. At a point associated with the deviation Δθ of 0, the direction of a magnetic field produced by a current agrees with the direction of a main magnetic flux φ. This brings about magnetic saturation to reduce the magnetic flux. Eventually, the d-axis inductance $L_d$ decreases, and the d-axis component $i_d$ of a fed-back current increases. This phenomenon is utilized in order to discriminate the north pole of the magnet from the south pole thereof.

The d-axis inductance $L_d$ shall be defined as the following formula (8):

$$L_d=L_{d'}(1-k\cdot\cos\Delta\theta) \quad(8)$$

where k denotes a change rate at which the inductance changes and which is a positive value smaller than 1.

When the formula (8) is assigned to the formula (7), the following formula is provided depending on the deviation Δθ:

if Δθ=0, $f_d=V^2/2L_{d'}(1-k)$;

if Δθ=π/2, $f_d=V^2/2L_q$;

if Δθ=π, $f_d=V^2/2L_{d'}(1+k)$; or if Δθ=3π/2, $f_d=V^2/2L_q$.

As the relationship $L_q>L_d$ is established, when the deviation Δθ equals 0, $f_d$ assumes a maximum value. Consequently, the position at which the deviation Δθ equals 0 is the true position of a magnetic pole.

The voltage command generator 9 transmits a high-frequency (sine-wave) voltage, of which amplitude is relatively small, as a d-phase voltage command (a q-phase voltage command has a zero level), whereby the motor is driven. Since the d-phase voltage command is a command of a small high-frequency voltage, a flowing current is limited. The rotor included in the motor 4 does not, therefore, rotate. In this state, the position-of-magnetic-pole inferring unit 7 varies the d-phase voltage command within one cycle of 360° of the command at a predetermined change rate at predetermined intervals so as to detect a point within 360° at which a deviation Δθ and an excitation phase ψ become consistent with each other. In other words, the aforesaid dq coordinate system is turned in order to detect an electrical angle consistent with the deviation Δθ. Specifically, a d-phase fed-back current $i_d$ is detected at predetermined intervals, and the product of the derivative of the d-phase fed-back current by the voltage command sent from the voltage command generator 9 is calculated in order to perform amplitude modulation. A high-frequency component is removed from the resultant voltage, and the excitation phase ψ causing the voltage to assume a maximum value is detected. A plurality of maximum values is averaged in order to correct a delay. Consequently, the excitation phase ψ whose direction is consistent with the direction of a magnetic flux is detected. In short, the value of the excitation phase ψ associated with the deviation Δθ of 0, by which the position of the rotor detected by the position detector 5, is deviated.

Thereafter, the excitation phase ψ is fixed in the direction of the magnetic flux. The voltage command generator causes currents, which are large enough to cause magnetic saturation and assume positive and negative values, to flow. The polarity is determined based on a difference between fed-back currents. Thus, the position of a magnetic pole is determined.

Figure 3:
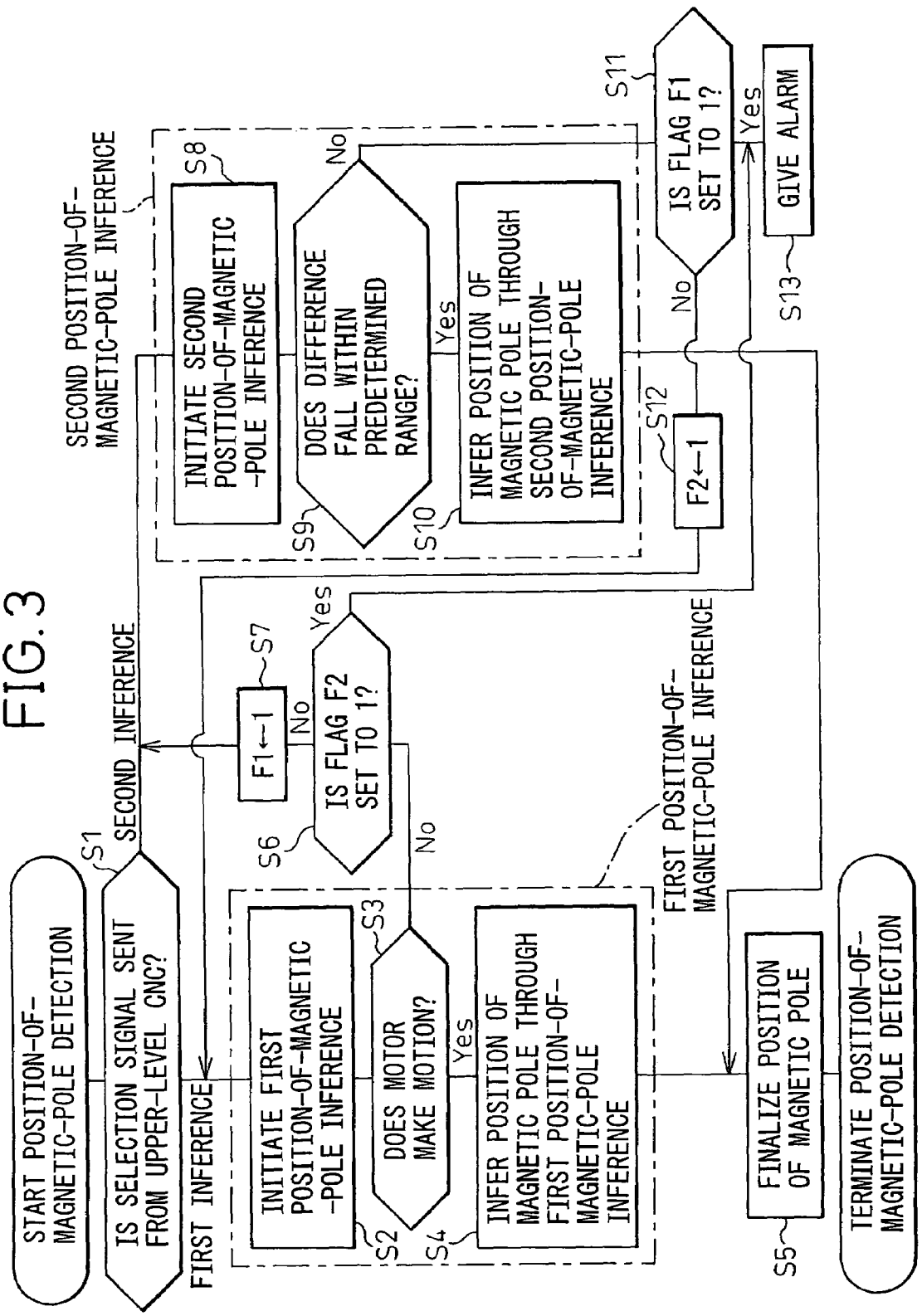
FIG. 3 describes an algorithm defining the whole of position-of-magnetic-pole detection in accordance with an embodiment of the present invention.

FIG. 3 describes an algorithm according to which a processor included in control equipment that controls the motor works as the embodiment of a position-of-magnetic-pole detecting device in accordance with the present invention.

In response to a command that instructs selection of a position-of-magnetic-pole inferring means or method and is sent from a computer numerical control (CNC) system that is an upper-level system of the motor control equipment, the processing described in FIG. 3 is initiated.

First, the received command is checked to see if it is a command selecting the first position-of-magnetic-pole inferring means or a command selecting the second position-of-magnetic-pole inferring means (step S1). If selection of the first position-of-magnetic-pole inferring means is instructed, the first position-of-magnetic-pole inference is initiated (step S2). Although the motor is driven with a direct current command having a predetermined magnitude during the first position-of-magnetic-pole inference, if the rotor makes no motion because of great friction against a machine or the like (step S3), a flag F2 is checked to see if it is set to 1 signifying that the position of a magnetic pole cannot be detected through the second position-of-magnetic-pole inference (step S6). If the flag F2 is not set to 1, a flag F1 is set to 1 signifying that the position of a magnetic pole cannot be detected through the first position-of-magnetic-pole inference (step S7). Processing then proceeds to the second position-of-magnetic-pole inference (a process from step S8 to step S10). Incidentally, the flags F1 and F2 are initialized to 0. Moreover, if the rotor moves the first position-of-magnetic-pole inference is executed (step S4), and the position of a magnetic pole is duly finalized (step S5). Steps S2 to S4 in FIG. 3 encircled with a dashed line are steps included in the first position-of-magnetic-pole inference, and will be detailed later.

If a command selecting the second position-of-magnetic-pole inferring means is transferred from the upper-level control system, or the first position-of-magnetic-pole inference is in progress, the position of a magnetic pole cannot be detected through the first position-of-magnetic-pole inference because the rotor makes no motion, the flag F1 is set to 1 at step S7. Thereafter, the second position-of-magnetic-pole inference including steps S8 to S10 is initiated (step S8). During the second position-of-magnetic-pole inference, when an excitation phase suggesting the position of a magnetic pole differs from one value to another, if the difference falls outside a predetermined range of set values, the motor is verified not to have the electrical characteristic of a salient-pole type. The position of a magnetic pole is therefore verified not to be inferred by the second position-of-magnetic-pole inferring means (step S9). In this case, the flag F1 is checked to see if it is set to 1 (step S11). If the flag F1 is set to 1, it signifies that the first position-of-magnetic-pole inference has already been executed and failed to detect the position of a magnetic pole. Therefore, an alarm is given and processing is terminated (step S13). If the flag F1 is not set to 1, it signifies that the first position-of-magnetic-pole inference has not been executed. Therefore, the flag F2 is set to 1 signifying that the position of a magnetic pole cannot be detected through the second position-of-magnetic-pole inference (step S12). Processing proceeds to step S1, and the first position-of-magnetic-pole inference is executed.

On the other hand, assuming that the difference between excitation phases suggesting the position of a magnetic pole is found at step S9 to fall within the predetermined range and the position of a magnetic pole (direction thereof) is detected. In this case, the second position-of-magnetic-pole inference proceeds so as to calculate and finalize the position of a magnetic pole (direction of one of magnetic poles and orientation of one of the north and south poles) (steps S10 and S5).

If the flag F2 is verified to be set to 1 at step S6, it signifies that the second position-of-magnetic-pole inference has already been performed and failed to detect the position of a magnetic pole. Processing therefore proceeds to step S13, and an alarm is given. The processing is then terminated.

Figure 4:
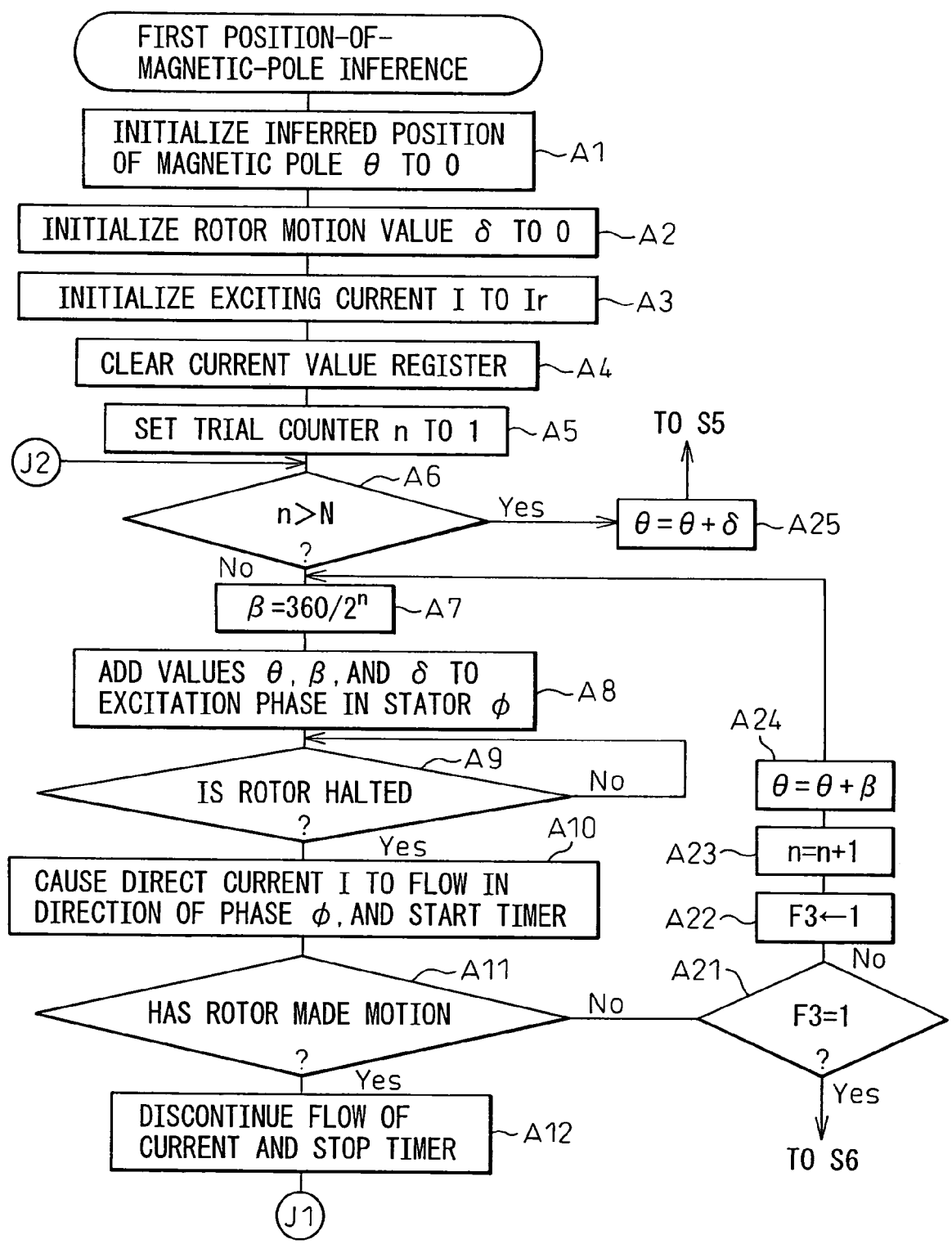
FIG. 4 and FIG. 5 describe an algorithm defining first position-of-magnetic-pole inference included in the embodiment.
Figure 5:
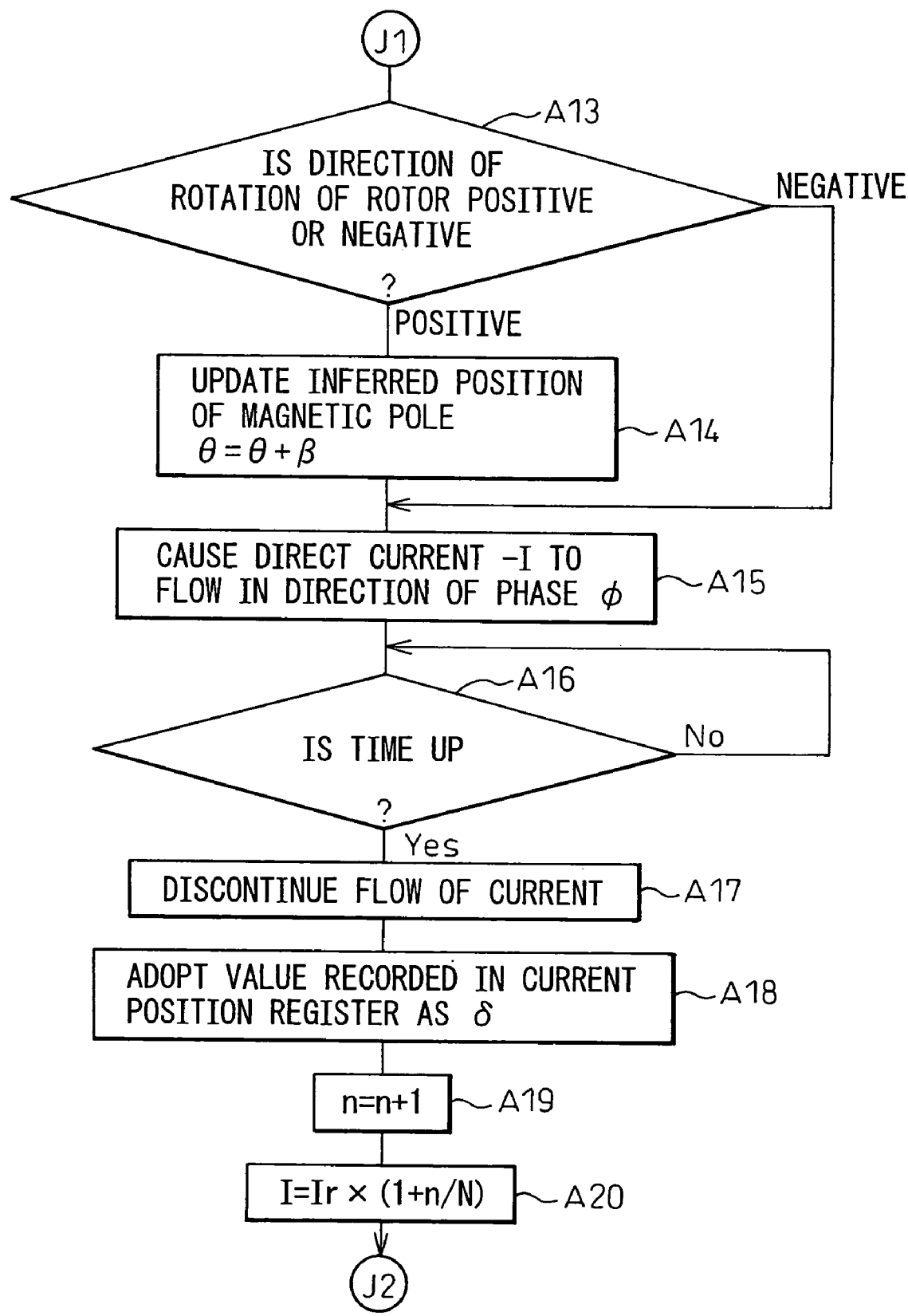

FIG. 4 and FIG. 5 describes an algorithm defining the first position-of-magnetic-pole inference (including steps S2 to S4 described in FIG. 3).

An initial value of 0 is recorded in a register holding an inferred position of a magnetic pole θ, 0 is recorded as an initial rotor motion value in a register holding a rotor motion value δ, and a value Ir of an initial exciting current is recorded in a register holding an exciting direct current I (steps A1 to A3). A current value register holding the position (position of the rotor) of the servo motor (synchronous motor) 4 is cleared to 0 according to a signal sent from the detector 5 (step A4). A trial counter n, that counts the number of repetitions by which a process from step A6 to step S20 that will be described later is repeated, is set to 1 (step A5).

The value indicated by the trial counter n is checked to see if it exceeds the predetermined number of repetitions N (step A6). If the counter value does not exceed the predetermined number of repetitions, 360° is divided by $2^n$ in order to calculate a phase value β that is a half of a range of phases determining the width of a domain in the rotor where the position of a magnetic pole (position of a magnetic flux) is thought to lie. Initially, the position of a magnetic pole in the rotor is inferred to lie within a domain whose width is determined with the range of electrical angles from 0° to 360°. As the trial counter n is set to 1, the phase value β that is a half of the range of phases determining the width of the inferred domain is calculated to be 180° (step S7). Thereafter, the phase value β that is a half of the range of phases determining the width of the inferred domain, and the rotor motion value δ are added to the position of a magnetic pole inferred at present (one end of the inferred domain, that is, an initial point of the inferred domain lying in the direction of a smaller phase), whereby an excitation phase φ in the stator is calculated (step A8). Initially, as the inferred position of a magnetic pole θ is 0, the phase value β is 180°, and the rotor motion value δ is 0, the excitation phase φ in the stator is determined to be 180°.

The rotor is checked to see if it is halted (a fed-back pulse is checked to see if it is returned from the detector 5) (step A9). If the rotor is halted, the dc exciting current I (which initially assumes the set value Ir) recorded in the register is caused to flow in the direction of the excitation phase φ calculated at step A8 (the current command generator 8 shown in FIG. 1 causes the dc exciting current to flow as a command current). At the same time, a timer is started (step A10).

Whether the rotor has moved is verified based on whether a fed-back pulse is returned from the detector 5 (step A11). If the rotor does not move, an excitation phase is presumably consistent with the position of a magnetic pole. The excitation phase is advanced by 90° and an exciting current is caused to flow in the direction of the excitation phase. Specifically, a flag F3 is checked to see if it is set to 1 (step A21). If the flag F3 is not set to 1, the flag F3 is set to 1 (step A21), and the trial counter n is incremented by one (step A23). The phase value β is added to the inferred position of a magnetic pole θ, whereby the inferred position of a magnetic pole θ is updated to 180° (step A24). Processing then returns to step A7. The trial counter n has been incremented by one to indicate 2. Therefore, the phase value β is calculated to be 90° and the excitation phase φ is calculated to be 270°. Consequently, the motor is excited in the direction of the excitation phase (steps A7 to A10).

Although an excitation phase is changed by 90° as mentioned above, if the rotor does not move, friction against a machine is so great that the rotor cannot move. Processing then proceeds from step A11 to step A21. As the flag F3 has already been set to 1, detection of the position of a magnetic pole according to the first position-of-magnetic-pole inferring method of detecting the position of a magnetic pole by actuating the rotor is verified to have failed. Processing then proceeds to step S6 in FIG. 3.

On the other hand, if the rotor is verified to have moved at step A11, the flow of an exciting current is discontinued and the timer is stopped (step A12). The direction of rotation in which the rotor rotates is checked in order to identify a domain in the rotor where the position of a magnetic pole lies (step A13).

As described previously, a torque produced with flow of a current through the synchronous motor is expressed as the formula (2). When the angle α formed between a magnetic flux vector and a current vector ranges from 0° to 180°, the direction of the torque is positive (sin α>0) When the angle α ranges from 180° to 360°, the direction of the torque is negative (sin α<0). Therefore, when a direct current I is caused to flow in the direction of the excitation phase φ of 180°, if the rotor rotates in the positive direction, the position of a magnetic pole in the rotor lies in a domain determined with a range of excitation phases from 180° to 360°. When the direct current I is caused to flow in the direction of the excitation phase φ of 270°, if the rotor rotates in the positive direction, the position of a magnetic pole in the rotor lies in a domain determined with a range of excitation phases from 270° to 360°. In this case, the phase value β that is a half of a range of phases determining a domain where the position of a magnetic pole is inferred to lie (=180° or 90°) is added to the inferred position of a magnetic pole θ (=0° or 180°), whereby a new inferred position of a magnetic pole θ (=180° or 270°) is worked out. In other words, a phase determining an initial point of a domain where the position of a magnetic pole is inferred to lie is recorded as the inferred position of a magnetic pole θ. In the foregoing case, as the position of a magnetic pole is inferred to lie in a domain in the rotor determined with the range of excitation phases in the stator from 180° to 360° (or 270° to 360°), 180° (or 270°) is recorded as the new inferred position of a magnetic pole θ (step A14).

If the rotor is verified to have rotated in the negative direction at step A13, the position of a magnetic pole in the rotor lies in a domain determined with a range of excitation phases from 0° to 180° (or 180° to 270°). At this time, the inferred position of a magnetic pole θ is not updated, but a lower limit of 0° of the range of excitation phases from 0° to 180° determining an initial point of a domain in which the position of a magnetic pole in the rotor is inferred to lie (or a lower limit of 180° of the range of excitation phases from 180° to 270°) is recorded as it is.

As the rotor has rotated, the rotor is returned to the original position. Therefore, a direct current of opposite polarity, −I, is caused to flow in the direction of the excitation phase φ in which the stator is excited at step A10, and the timer is set to an elapsed time measured at step A12 and then started (step A15). When the timer completes the countdown because the time is up (step A16), the flow of the exciting current is discontinued (step A17). In short, the exciting current of opposite polarity having the same magnitude is caused to flow for a certain period of time so that the rotor will make a reverse motion corresponding to the motion the rotor has made to return to the original position.

However, even when the rotor is said to be returned to the original position, the rotor cannot be returned to exactly the original position. Therefore, the value in the current position register is read out and saved as the rotor motion value δ in the register (step A18). The trial counter n is incremented by one (step A19). The value of the direct current I to be used for the next excitation is calculated according to the following formula (9) (step A20).

$$I = Ir \times (1 + n/N) \qquad (9)$$

According to the present invention, a phase in the direction of which the direct current I is caused to flow is sequentially approached to the position of a magnetic pole in the rotor so that they will be consistent with each other. In other words, a magnetic flux vector and a current vector approach each other so that they will be consistent with each other. As described previously, a torque exerted in rotating the rotor is expressed as $|I||\Phi| \sin \alpha$. When the direct current I remains constant, the torque dies away. According to the present embodiment, every time a phase at which excitation occurs is changed (approaches the position of a magnetic pole in the rotor), the exciting direct current I is increased.

The process returns to step A6. A process from step A6 to step A20 is repeatedly executed until the trial counter n exceeds the set value N.

As mentioned above, a domain in the rotor where the position of a magnetic pole lie is inferred, and the width of the domain is gradually diminished (in the present embodiment, the width of the domain is halved). Thus, the inferred position of a magnetic pole θ is detected.

According to the present embodiment, when the trial counter value n is set to 1, the phase value β determining the width of the domain where the position of a magnetic pole lies is as small as 180° or a half of 360°. When the trial counter value n is set to 2, the phase value β is 90°. When the trial counter value n is set to 3, the phase value β is 45°. When the trial counter value n is set to 4, the phase value β is 22.5°. When the trial counter value n is set to 10, the phase value β is 0.3516°. When the trial counter value n is set to 11, the phase value β is 0.1758°. The lower limit of a range of phases determining the initial point of the domain is accepted as the inferred position of a magnetic pole θ. When the set value N is determined to provide required precision, the inferred position of a magnetic pole θ with required precision can be obtained.

Thus, if the trial counter value n is found at step A6 to exceed the set value N, the process proceeds to step A25. The rotor motion value δ is added to the inferred position of a magnetic pole θ in order to finalize the inferred position of a magnetic pole θ. The process then proceeds to step S5 in FIG. 3, and the position of a magnetic pole is finalized.

So far, the algorithm defining the first position-of-magnetic-pole inferring method has been described.

Figure 6:
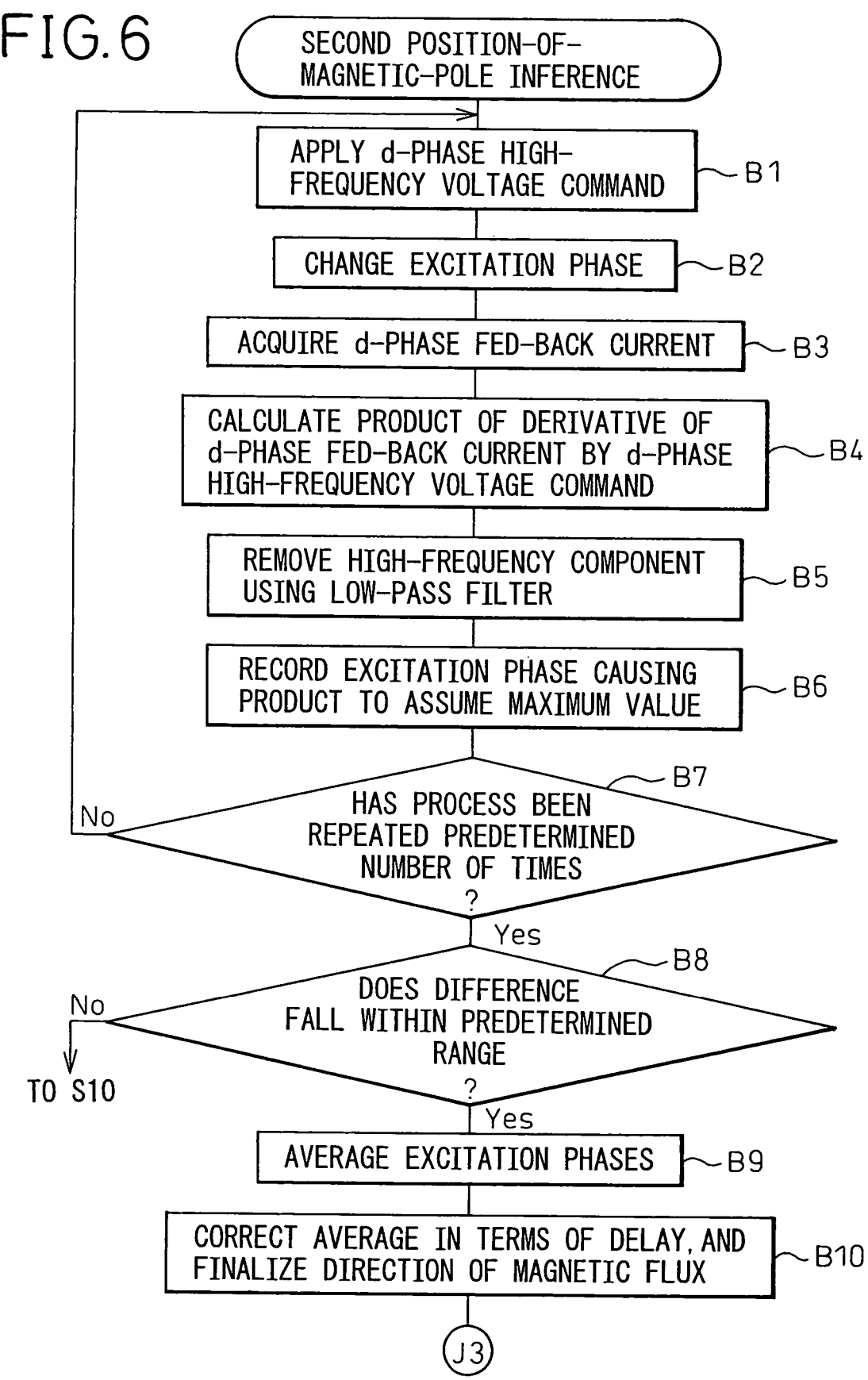

FIG. 6 and FIG. 7 describe an algorithm defining the second position-of-magnetic-pole inferring method.

According to the second position-of-magnetic-pole inferring method, the switch SB shown in FIG. 1 has the contact b thereof made. A high-frequency (sine-wave) voltage whose amplitude is relatively small so as not to allow the rotor in the motor to make a motion is transferred as a d-phase voltage command. At this time, a q-phase voltage command is set to a zero level. The motor is thus driven (step B1). As the voltage command has a high frequency but a small amplitude, the rotor does not move. An excitation phase ψ is changed by a predetermined magnitude at predetermined intervals (step B2). A d-phase fed-back current is read synchronously with the change in the excitation phase ψ by the predetermined magnitude (step B3). The derivative $pi_d$ of the d-phase fed-back current is calculated based on the difference between the read d-phase fed-back current value $i_d$ and a d-phase fed-back current value $i_d$ read during the previous interval. The product $f_d$ of the derivative $pi_d$ by the high-frequency voltage command transferred at step B1 is calculated (see the formula (6)) (step B4). The product $f_d$ is subjected to low-pass filtering in order to remove a high-frequency component (see the formula (7)) (step B5). Thus, the excitation phase ψ causing the product $f_d$, which has the high-frequency component thereof removed, to assume a maximum value is detected (step B6). Specifically, a register is included for recording a peak value assumed by the product $f_d$ having the high-frequency component thereof removed. The product $f_d$ calculated at steps B4 and B5 is compared with the value recorded in the register. If the product $f_d$ is larger, the calculated product $f_d$ value is saved in the register. The excitation phase ψ causing the product $f_d$ to assume the peak value is recorded in a register. The process from step B1 to step B6 is executed at predetermined intervals of an electrical angle of 180°. When the process executed relative to the electrical angle of 180° is completed, a maximum value which the product $f_d$ has assumed within one interval of the electrical angle of 180° is detected. Consequently, the excitation phase ψ causing the product $f_d$ to assume the maximum value is determined.

Whether the process to be executed at intervals of the electrical angle of 180° by which one cycle of 360° is divided is repeated a predetermined even number of times (for example, eight times in units of 180° or four times in units of 360°) is verified (step S7). If the process has not been repeated by the predetermined number of times, the process starting at step S1 is resumed. Thus, the excitation phase ψ causing the product $f_d$ to assume the maximum value within the electrical angle of 180° is determined relative to each of the predetermined number of times or each of the predetermined number of intervals of the electrical angle of 180°. Selecting either of two excitation phases ψ causing the product $f_d$ to assume the maximum values within one cycle of 360° (for example, a smaller excitation phase ψ) is performed relative to four pairs of determined excitation phases. The difference between the largest and smallest values among the selected excitation phases corresponding to electrical angles is checked to see if it falls within a predetermined range. Namely, the selected excitation phases are checked to see if they have differences (step B8). In case of an electric salient-pole type motor, the selected excitation phases have no differences but fall within the predetermined range. However, in case of a motor that is not of the electric salient-pole type, the selected excitation phases have differences. In this case, the position of a magnetic pole cannot be detected according to the second position-of-magnetic-pole inferring method. Processing therefore proceeds to step S11 in FIG. 3.

On the other hand, if the selected excitation phases have no differences, they are averaged, and the average is adopted as the excitation phase ψ causing the product $f_d$ to assume a peak value (step B9). The average is corrected in terms of a delay caused by feedback or filtering, whereby the direction of a magnetic flux is determined (step B10). Namely, the excitation phase ψ (direction of a magnetic flux) associated with the deviation Δθ of a magnetic pole from the d-axis which assumes 0 or π is determined. Thereafter, the orientation of a magnetic pole whose position lies in the direction of the determined excitation phase ψ is determined.

First, the excitation phase ψ is fixed to the direction of a magnetic flux determined at step B10 (step B11). A positive rectangular-wave voltage having a predetermined cycle and a relatively large magnitude is applied as a d-phase voltage command so that a current large enough to cause magnetic saturation will flow through the motor for the purpose of driving the motor (step B12). In this case, as the excitation phase is consistent with the direction of the d-axis, even if the large current flows, the rotor included in the motor makes no motion. The peak value (maximum value) of a d-phase fed-back current is measured and recorded (step B13). Thereafter, when a predetermined time has elapsed (the voltage command is set to a zero level for the predetermined time), a rectangular-wave voltage having an opposite sign (negative voltage) but having the same magnitude is applied as a d-phase voltage command in order to drive the motor (step B14). Even in this case, the rotor in the motor does not rotate. The peak value (minimum value) of the d-phase fed-back current is measured and recorded (step B15).

The maximum value and minimum value of the peak values assumed by the d-phase fed-back current and measured at step B12 and B14 respectively are added up, and the thus obtained sums are integrated (step B16). Whether the calculation has been executed a predetermined number of times is verified. If the calculation has not been executed the predetermined number of times, processing returns to step B12, and the foregoing process starting at step B12 is repeatedly executed (step B17). After the peak values (maximum and minimum values) of the d-phase fed-back current are measured and added up the predetermined number of times, the resultant sums are integrated. Thereafter, the integrated value is checked to see if it is positive or negative (step B18). If the integrated value is positive, the direction of the excitation phase ψ and the orientation of the magnetic pole are consistent with each other. The current excitation phase ψ is regarded to be consistent with the direction of a main magnetic flux and is associated with the deviation Δθ of 0, and determined as a position of excitation θ (step B20). On the other hand, if the integrated value is negative, the direction of the current excitation phase is opposite to the direction of a main magnetic flux and is associated with the deviation Δθ of π. Therefore, 180° is added to the current excitation phase ψ (step B19), and a position lying in the direction of the resultant angle is finalized as the position of excitation θ (step B20). Processing then returns to step S5 in FIG. 3.

The position-of-magnetic-pole detecting method in accordance with the present embodiment has been described so far. Consequently, if it is impossible to detect the position of a magnetic pole by actuating a rotor because friction against a machine is too great, the second position-of-magnetic-pole inferring method is adopted. As long as a motor has the electrical characteristic of a salient-pole type, the position of a magnetic pole can be detected according to the second position-of-magnetic-pole inferring method. Moreover, when a motor is of a non-salient pole type, the position of a magnetic pole is detected according to the first position-of-magnetic-pole inferring method of detecting the position of a magnetic pole by actuating a rotor. Moreover, if the position of a magnetic pole cannot be detected according to the first position-of-magnetic-pole inferring method, the second position-of-magnetic-pole inferring method is automatically adopted. If the position of a magnetic pole cannot be detected according to the second position-of-magnetic-pole inferring method, the first position-of-magnetic-pole inferring method is automatically adopted. Only when the position of a magnetic pole cannot be detected according to both the first and second position-of-magnetic-pole inferring methods, an alarm is given. The case where an alarm is given, that is, the position of a magnetic pole cannot be detected, is limited to a case where a motor is of the non-salient pole type and the friction of a machine connected to the motor is too great. Thus, the case where the position of a magnetic pole cannot be detected is quite rare.

The present invention has the advantages described below. Since the first position-of-magnetic-pole inferring means autonomously detects the position of a magnetic pole by actuating the motor, the position of a magnetic pole in the synchronous motor can be automatically detected irrespective of whether the motor has the electrical characteristic of a salient-pole type. Moreover, if the first position-of-magnetic-pole inferring means fails to detect the position of a magnetic pole because the motor makes no motion due to great friction against a machine, as long as the synchronous motor has the electrical characteristic of a salient-pole type, the second position-of-magnetic-pole inferring means can autonomously detect the position of a magnetic pole. A case where the position of a magnetic pole in a synchronous motor cannot automatically be detected is quite rare.

What is claimed is:

1. A position-of-magnetic-pole detecting device for detecting a position of a magnetic pole in a rotor included in a synchronous motor, comprising:
    a current command applying means for applying a current command in the direction of a predetermined excitation phase;
    a first position-of-magnetic-pole inferring means for inferring the position of a magnetic pole from the direction of rotation in which the motor rotates responsively to the current command;
    a voltage command applying means for applying a voltage command in the direction of the predetermined excitation phase;
    a second position-of-magnetic-pole inferring means for inferring the position of a magnetic pole from a feedback current returned responsively to the voltage command; and
    a means for selecting either of the first and second position-of-magnetic-pole inferring means that infer the position of a magnetic pole.

2. The position-of-magnetic-pole detecting device according to claim 1, wherein, although a current command is applied so that the first position-of-magnetic-pole inferring means will infer the position of a magnetic pole, if the motor does not rotate, the means for selecting either of the first and second position-of-magnetic-pole inferring means autonomously selects the second position-of-magnetic-pole inferring means.

3. The position-of-magnetic-pole detecting device according to claim 1, wherein a difference between positions of a magnetic pole inferred by the second position-of-magnetic-pole inferring means exceeds a predetermined range, the means for selecting either of the first and second position-of-magnetic-pole inferring means autonomously selects the first position-of-magnetic-pole inferring means.

4. A position-of-magnetic-pole detecting device for detecting a position of a magnetic pole in a rotor included in a synchronous motor, comprising:
    a current command applying means for applying a current command in the direction of a predetermined excitation phase;
    a first position-of-magnetic-pole inferring means for inferring a domain, where a position of a magnetic pole lies and which has the width thereof determined with a range of electrical angles, from the direction of rotation in which the motor rotates responsively to the current command, and the excitation phase, reducing the domain, and thus inferring the position of a magnetic pole;
    a voltage command applying means for applying a voltage command in the direction of the predetermined excitation phase;
    a second position-of-magnetic-pole inferring means for inferring the position of a magnetic pole from a feedback current returned responsively to the voltage command applied with the excitation phase sequentially changed, applying a voltage, which is high enough to cause magnetic saturation, so as to determine the orientation of a magnetic pole, and thus inferring the position of a magnetic pole; and
    a means for selecting either of the first and second position-of-magnetic-pole inferring means that infer the position of a magnetic pole.

5. The position-of-magnetic-pole detecting device according to claim 4, wherein, although a current command is applied so that the first position-of-magnetic-pole inferring means will infer the position of a magnetic pole, if the motor does not rotate, the means for selecting either of the first and second position-of-magnetic-pole inferring means autonomously selects the second position-of-magnetic-pole inferring means.

6. The position-of-magnetic-pole detecting device according to claim 4, wherein a difference between positions of a magnetic pole inferred by the second position-of-magnetic-pole inferring means exceeds a predetermined range, the means for selecting either of the first and second position-of-magnetic-pole inferring means autonomously selects the first position-of-magnetic-pole inferring means.

* * * * *